United States Patent [19]

Yukawa

[11] 4,177,415

[45] Dec. 4, 1979

[54] VOLTAGE REGULATOR FOR USE WITH A POLYPHASE MAGNETO GENERATOR

[75] Inventor: Hideki Yukawa, Susono, Japan

[73] Assignee: Kokusan Denki Co., Ltd., Numazu, Japan

[21] Appl. No.: 897,866

[22] Filed: Apr. 19, 1978

[30] Foreign Application Priority Data

Apr. 22, 1977 [JP] Japan ............................ 52-50300

[51] Int. Cl.$^2$ .......................... H02J 7/14; H02P 9/00
[52] U.S. Cl. ........................... 322/28; 320/71; 322/90; 322/91
[58] Field of Search ............ 322/89, 90, 91–94, 322/28; 320/71

[56] References Cited

U.S. PATENT DOCUMENTS

| | | | |
|---|---|---|---|
| 3,443,200 | 5/1969 | Kuhn . | |
| 3,456,182 | 7/1969 | Cummins et al. . | |
| 3,517,234 | 6/1970 | Maier | 322/94 X |
| 3,601,685 | 8/1971 | Kuhn | 322/91 X |
| 3,660,752 | 5/1972 | Pfeffer | 322/93 X |
| 3,997,833 | 12/1976 | Boyama | 322/91 X |

*Primary Examiner*—Robert J. Hickey
*Attorney, Agent, or Firm*—Pearne, Gordon & Sessions

[57] ABSTRACT

A voltage regulator for use with a polyphase magneto generator and in combination with a rectifier circuit provided to rectify the output of the generator to charge a battery, comprises at least two thyristors having the anodes respectively connected to the output terminals of the generator having phases adjacent to each other, having the cathodes connected to the negative output terminal of the rectifier circuit, and having the gates connected to each other. A trigger device is adapted to supply gate signals to the gates of the thyristors when the voltage of the output terminal having a phase in advance of the phases of the output terminals to which the anodes of the thyristors are connected exceeds a predetermined value. As the battery terminal voltage is excessive the thyristors are rendered conductive to short-circuit the output of the generator.

5 Claims, 2 Drawing Figures

VOLTAGE REGULATOR FOR USE WITH A POLYPHASE MAGNETO GENERATOR

BACKGROUND OF THE INVENTION

The present invention relates to a voltage regulator for use with a polyphase magneto generator and in combination with a rectifier circuit provided to rectify the output of the generator to charge a battery, and more particularly to a voltage regulator having thyristors adapted to short-circuit the output of the generator when the battery terminal voltage is excessive.

A prior art voltage regulator of the above mentioned type employs a plurality of the thyristors for short-circuiting the output of a generator. A voltage sensing device is provided to detect the voltage of the battery and to trigger an auxiliary thyristor when the battery terminal voltage is excessive. The auxiliary thyristor itself is provided to trigger one of the main thyristors for short-circuiting the output of the winding of the generator having the phase in advance of any of the remaining windings associated with the remaining thyristors. Each of the remaining thyristors are provided to be triggered by a voltage drop across a resistor or a diode connected in series with one of other thyristors for short-circuiting the output of the windings in advance of the winding associated with the thyristor to be triggered. Since large short-circuiting currents flow through the resistors or the diodes in series with the main thyristors, they need to have large capacity, and are therefore large in volume and expensive.

SUMMARY OF THE INVENTION

An object of the present invention is to eliminate the disadvantages of the prior art voltage regulator, and to provide a voltage regulator which is compact in size and economical to manufacture.

Another object of the present invention is to provide a voltage regulator wherein the thyristors are evenly utilized even if they have different gate sensitivities, so that the capacities of the thyristors can be reduced.

A voltage regulator according to the present invention is for use with a polyphase magneto generator and in combination with a rectifier circuit provided to rectify the output of the generator to charge a battery. The voltage regulator comprises at least two thyristors for short-circuiting the output of the generator when the battery terminal voltage exceeds a reference value. The anodes of the thyristors are respectively connected to the AC output terminals of the generator having phases adjacent to each other. The cathodes of the thyristors are connected to the negative output terminal of the rectifier circuit. The gates of the thyristors are connected to each other. The voltage regulator also comprises a trigger device adapted to supply gate signals to the gates of the thyristors when the voltage of the output terminal having a phase in advance of the phases of the output terminals to which the anodes of the thyristors are connected exceeds a predetermined value. As the battery terminal voltage is excessive the thyristors are rendered conductive to short-circuit the output of the generator. The thyristors that are positively biased when the gate signals are supplied from the trigger device are turned on by such gate signals. The thyristors that are not positively biased when the gate signals are supplied by the trigger device are turned on by a voltage drop across the gate and the cathode of the thyristors which are already conducting.

The polyphase generator may comprise a three phase generator, and there may be provided two thyristors having the anodes connected to two of the three output terminals of the generator, and the trigger device may be adapted to supply gate signals to the gates of the thyristors when the voltage of the third output terminal exceeds the predetermined value.

The trigger device may comprises a voltage divider having the input terminals connected across the third output terminal of the generator and the negative output terminal of the rectifier circuit, and a Zener diode having the anode connected to the gates of the thyristors and having the cathode connected to the divided output terminal of the divider.

The divider may comprise a series circuit of resistors having both ends constituting the input terminals of the divider.

The rectifier circuit may comprise a bridge circuit having the input terminals respectively connected to the output terminals of the generator.

As the voltage regulator according to the present invention does not require bulky and expensive resistors or diodes in series with the short-circuiting thyristors, the size and the cost of the voltage regulator are substantially reduced.

BRIEF DESCRIPTION OF THE DRAWINGS

Other features and advantages of the invention will be apparent from the following detailed description of the invention taken in conjunction with the accompanying drawings, in which.

DETAILED DESCRIPTION OF THE PREFERRED EMBODIMENTS

Figure 1:
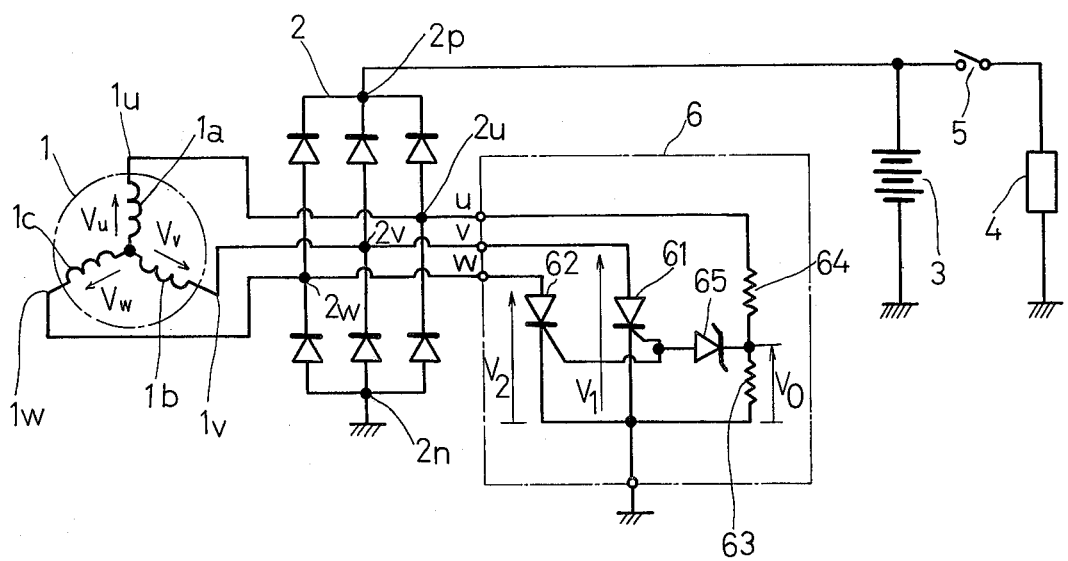
FIG. 1 shows a voltage regulator according to the present invention, for use with a three phase magneto generator and in combination with a rectifier circuit.

Referring now more particularly to FIG. 1, there is shown an embodiment of a voltage regulator according to the present invention. The voltage regulator 6 is shown as being used with a three phase magneto generator 1 and in combination with a rectifier circuit 2. The generator 1 has three generating windings 1a, 1b, 1c in star connection. The phase sequence is such that the output of the winding 1a is in advance of the output of the winding 1b, the output of the winding 1b is in advance of the output of the winding 1c, and the output of the winding 1c is in advance of the output of the winding 1a. The output terminals 1u, 1v, 1w of the windings 1a, 1b, 1c are respectively connected to the input terminals 2u, 2v, 2w of the rectifier circuit 2. The negative output terminal 2n of the rectifier circuit 2 is grounded, and the positive output terminal 2p of the rectifier circuit 2 is connected to the positive terminal of a battery 3, whose negative terminal is grounded. A load 4 is connected through a switch 5 across the battery 3.

The voltage regulator 6 comprises a pair of thyristors 61, 62 having their anodes respectively connected to the input terminals 2v, 2w of the rectifier circuit 2, and having their cathodes grounded. The gates of the thyristors 61, 62 are connected to the anode of a Zener diode 65. A resistor 63 is connected across the cathode of the Zener diode 65 and the ground. A resistor 64 has one end connected to the cathode of the Zener diode 65 and has the other end connected to the input terminal 2u. Among the members mentioned above, the Zener diode 65, and the resistors 63, 64 form a device for detecting the battery terminal voltage and for supplying signals to the gates of the thyristors 61, 62 when the voltage on the terminal 2u and hence on the terminal 1u exceeds a predetermined value.

The resistors 63, 64 form a divider having the input terminals connected across the terminal 2u and the terminal 2n, and the divided output is applied to the cathode of the Zener diode.

While the battery terminal voltage is below a reference value, and the voltage $v_o$ across the resistor 63 is below the Zener voltage of the Zener diode 65, no signal is supplied to the gates of the thyristors 61, 62, which are therefore maintained nonconductive.

Figure 2:
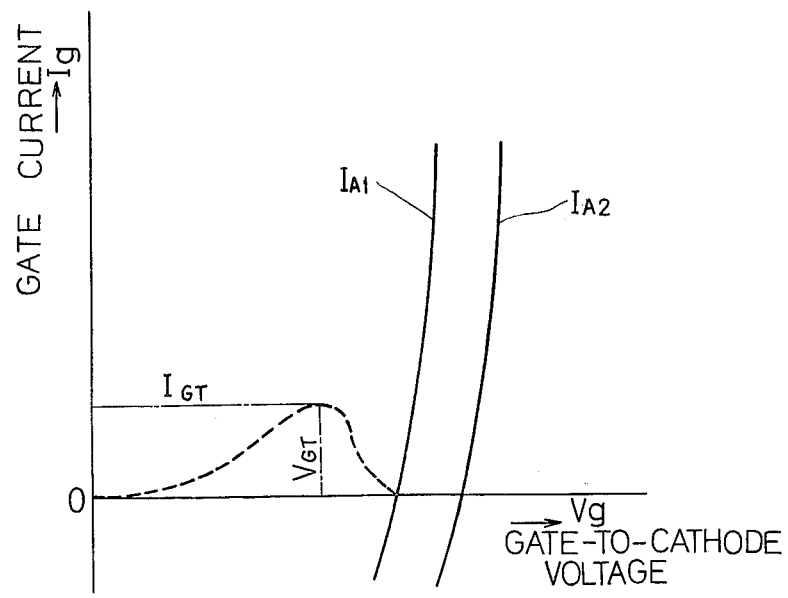
FIG. 2 shows voltage-to-current characteristics of thyristors in conductive state.

As the battery terminal voltage rises and the voltage $v_o$ across the resistor 63 exceeds the Zener voltage of the Zener diode 65, currents are supplied to the gates of the thyristors 61, 62. It may be that the thyristor 61 has a higher gate sensitivity than the thyristor 62. In that case, as the battery terminal voltage gradually rises, the thyristor 61 is the first to be turned on. The conducting thyristor 61 permits a short-circuiting current to flow therethrough. As the thyristor 61 is conducting and permitting a large short-circuiting current to flow therethrough, there appears a substantial voltage across the gate and the cathode of the conducting thyristor 61. The relationship between the gate-to-cathode voltage and the anode current is shown in FIG. 2. It will be understood that as the anode current is increased (from $I_{A1}$ to $I_{A2}$) the gate-to-cathode voltage Vg is increased to provide a sufficient gate signal to the thyristor 62 having its gate coupled to the gate of the thyristor 61. Therefore, as the voltage Vw exceeds the voltage Vu, and hence as the thyristor 62 is positively biased, the thyristor 62 is turned on to permit a short-circuiting current to flow therethrough. The conduction of the thyristor 61 is terminated when the voltage Vv is exceeded by the voltage Vu and therefore the thyristor 61 is negatively biased. Conduction of the thyristor 62 is terminated when the voltage Vw is exceeded by the voltage Vv and therefore the thyristor 62 is negatively biased. Such operation may be repeated every cycle of the generator's output, and the battery terminal voltage is thereby regulated.

On the other hand, it may be that the thyristor 62 has a higher gate sensitivity. In that case, as the battery terminal voltage gradually rises, the thyristor 62 is the first to be turned on. The conducting thyristor 62 permits a short-circuiting current to flow therethrough. However, turn-on of the thyristor 62 is effected at a relatively late timing of the period while the thyristor 62 is positively biased. Accordingly, conduction of the thyristor 62 does not last for a sufficiently long time to regulate the battery terminal voltage. The battery terminal voltage rises further, and accordingly the voltage $v_o$ rises further to become sufficient to trigger the thyristor 61. Consequently, the thyristor 61 is turned on and the thyristor 62 is subsequently turned on in a manner already described above.

As has been made apparent, even if the thyristors have different gate sensitivities, it is ensured that both thyristors are turned on, and the load on the thyristors is evenly divided. The capacities of the thyristors can therefore be reduced.

When the invention is applied to a three phase system, it is not necessary to determine the phase sequence of the generator output terminals when connecting the voltage regulator to the generator. One just has to connect the anodes of two thyristors respectively to any of the output terminals of the generator and to connect the trigger device to the remaining output terminal. By connecting the voltage regulator without determining the phase sequence, one can fulfill the condition that the anodes of the thyristors are connected to the output terminals of the generator having phases adjacent to each other and the trigger device is responsive to the voltage of a phase in advance of the phases of the output terminals to which the anodes of the thyristors are connected. Accordingly, work involved in connecting the voltage regulator to the generator is substantially facilitated.

The invention has been described with reference to a three phase system, however the voltage regulator can be modified to operate on other polyphase systems other than three phase. In any case, there should at last two thyristors for short-circuiting the output of phases adjacent to each other, and a trigger device for triggering the thyristors when the voltage on the output terminal having a phase in advance of the phases of the output terminals short-circuited by the thyristors exceeds a predetermined value.

Since the voltage regulator of the invention does not require resistors or diodes in series with the short-circuiting thyristors, the size and cost of the regulator are substantially reduced.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A voltage regulator for use with a polyphase magneto generator and in combination with a rectifier circuit provided to rectify the output of the generator to charge a battery, said voltage regulator comprising:
    at least two thyristors having the anodes respectively connected to the AC output terminals of the generator having phases adjacent to each other, having the cathodes connected to the negative output terminal of the rectifier circuit, and having the gates connected to each other, and
    trigger means adapted to supply gate signals to the gates of said thyristors when the voltage of the output terminal having a phase in advance of the phases of the output terminals to which the anodes of said thyristors are connected exceeds a predetermined value,
    whereby as the terminal voltage of the battery is excessive said thyristors are rendered conductive to short-circuit the output of the generator.

2. A voltage regulator as set forth in claim 1, wherein the generator comprises a three phase generator,
    said at least two thyristors comprises two thyristors having the anodes connected to two of the three output terminals of the generator, and
    said trigger means is adapted to supply gate signals to the gates of said thyristors when the voltage of the third output terminal exceeds the predetermined value.

3. A voltage regulator as set forth in claim 2, wherein said trigger means comprises a voltage divider having the input terminals connected across said third output terminal of the generator and the negative output terminal of the rectifier circuit, and a Zener diode having the anode connected to the gates of said thyristors and having the cathode connected to the divided output terminal of said divider.

4. A voltage regulator as set forth in claim 4, wherein said divider comprises a series circuit of resistors having both ends constituting the input terminals of said divider.

5. A voltage regulator as set forth in claim 1, wherein the rectifier circuit comprises a bridge circuit having the input terminals respectively connected to the output terminals of the generator.

* * * * *